(12) United States Patent
Tasan

(10) Patent No.: US 12,276,308 B2
(45) Date of Patent: Apr. 15, 2025

(54) DRIVESHAFT WITH A SLIDABLE COUPLING

(71) Applicant: TIRSAN KARDAN SANAYI VE TICARET A.S., Manisa (TR)

(72) Inventor: Korkut Tasan, Manisa (TR)

(73) Assignee: TIRSAN KARDAN SANAYI VE TICARET A.S., Manisa (TR)

( * ) Notice: Subject to any disclaimer, the term of this patent is extended or adjusted under 35 U.S.C. 154(b) by 461 days.

(21) Appl. No.: 17/277,709

(22) PCT Filed: Jun. 22, 2019

(86) PCT No.: PCT/TR2019/050490
§ 371 (c)(1),
(2) Date: Mar. 18, 2021

(87) PCT Pub. No.: WO2020/081028
PCT Pub. Date: Apr. 23, 2020

(65) Prior Publication Data
US 2021/0348654 A1  Nov. 11, 2021

(51) Int. Cl.
*F16D 3/06* (2006.01)
*B60K 17/22* (2006.01)
(Continued)

(52) U.S. Cl.
CPC .............. *F16D 3/06* (2013.01); *B60K 17/22* (2013.01); *F16D 1/076* (2013.01); *F16D 3/12* (2013.01);
(Continued)

(58) Field of Classification Search
CPC ... F16D 3/06; F16D 1/076; F16D 3/12; F16D 3/845; F16D 2300/22; B60K 17/22; F16C 2326/06
(Continued)

(56) References Cited

U.S. PATENT DOCUMENTS 1,186,325 A * 6/1916 Metzger ................. F16L 15/006
1,657,291 A * 1/1928 Weiland .................... F16D 3/78
464/162
(Continued)

FOREIGN PATENT DOCUMENTS

DE  102007004212 A1  9/2007
DE  102008015028     9/2009
(Continued)

OTHER PUBLICATIONS

Universal Joint and Driveshaft Design Manual, AE-7, Society of Automotive Engineers, Inc., Warrendale, PA, Section 3.1.5, pp. 93-95, TJ1079.S62. (Year: 1979).*
(Continued)

*Primary Examiner* — Greg Binda
(74) *Attorney, Agent, or Firm* — Kilpatrick Townsend & Stockton LLP

(57) ABSTRACT

A driveshaft assembly comprising an elongated front shaft (3), a retaining element (10) being engaged from a connection end (50) with the front shaft (3) in a co-rotating manner and a coupling device (20) secured to the front shaft (3) by means of the retaining element (10) is provided. The driveshaft further comprises a gear part (52) which is extending on the connection end (50) and the retaining element (10) is having a sleeve (17) fits to the gear part (52) in axially slidable manner.

7 Claims, 1 Drawing Sheet

(51) Int. Cl.
*F16D 1/076* (2006.01)
*F16D 3/12* (2006.01)
*F16D 3/84* (2006.01)

(52) U.S. Cl.
CPC .......... *F16D 3/845* (2013.01); *F16C 2326/06* (2013.01); *F16D 2300/22* (2013.01)

(58) Field of Classification Search
USPC .................................................... 464/93, 162
See application file for complete search history.

(56) References Cited

U.S. PATENT DOCUMENTS

| | | | | |
|---|---|---|---|---|
| 2,712,741 | A | * | 7/1955 | Roller ........................ F16D 3/78 |
| | | | | 464/95 |
| 3,406,536 | A | * | 10/1968 | Domer ........................ F16D 3/68 |
| | | | | 464/93 |
| 4,114,472 | A | * | 9/1978 | Hornig ..................... B60K 17/22 |
| | | | | 464/93 |
| 5,230,540 | A | * | 7/1993 | Lewis ..................... F16L 23/162 |
| 5,716,276 | A | * | 2/1998 | Mangas ................... F16C 3/035 |
| | | | | 464/162 |
| 6,193,612 | B1 | | 2/2001 | Craig et al. |
| 7,178,423 | B2 | | 2/2007 | Breese et al. |
| 2002/0132675 | A1 | | 9/2002 | Glowacki et al. |
| 2002/0132676 | A1 | | 9/2002 | Glowacki et al. |
| 2003/0232652 | A1 | | 12/2003 | Mahendru et al. |
| 2007/0129154 | A1 | | 6/2007 | Valovick |
| 2015/0119154 | A1 | | 4/2015 | Choi |

FOREIGN PATENT DOCUMENTS

| | | | | |
|---|---|---|---|---|
| DE | 102008019725 | | 10/2009 | |
| DE | 102011085962 | | 5/2013 | |
| FR | 707930 | * | 7/1931 | ...................... 464/94 |
| GB | 1003750 | | 9/1965 | |
| WO | 2007100593 | | 9/2007 | |
| WO | 2020081028 | A2 | 4/2020 | |

OTHER PUBLICATIONS

"BMW 320d E90 Sedan Europe M47N2", Drive Shaft, Available Online at: http://bmwfans.info/parts-catalog/E90/Europe/320d-M47N2/L-N/apr2006/browse/drive_shaft/, Apr. 2006, 1 page.
PCT/TR/2019/050490 , "International Search Report and Written Opinion", May 8, 2020, 7 pages.
EP19873784.3 , "Extended European Search Report", May 6, 2022, 8 pages.
TR2018/13607 , "Search Report", Oct. 13, 2020, 2 pages.

* cited by examiner

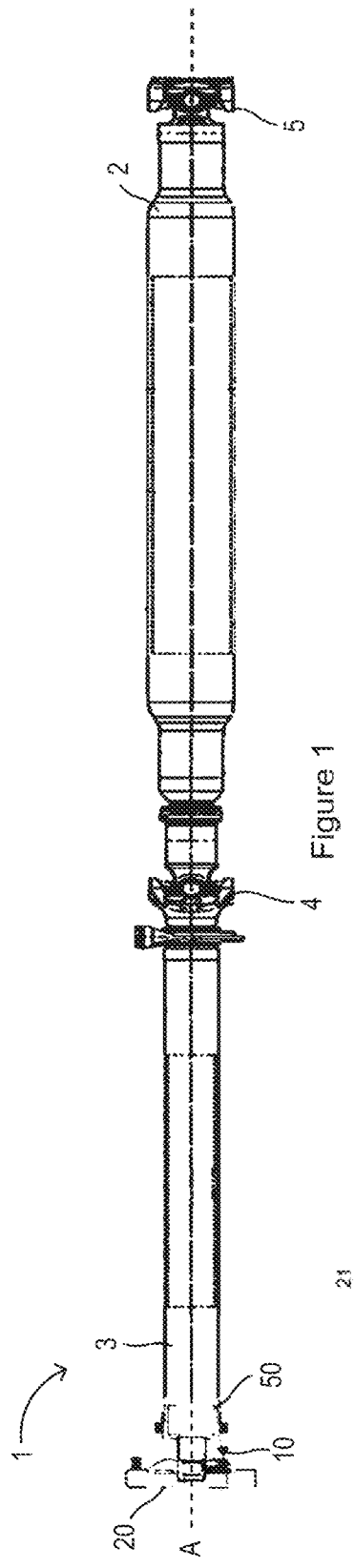
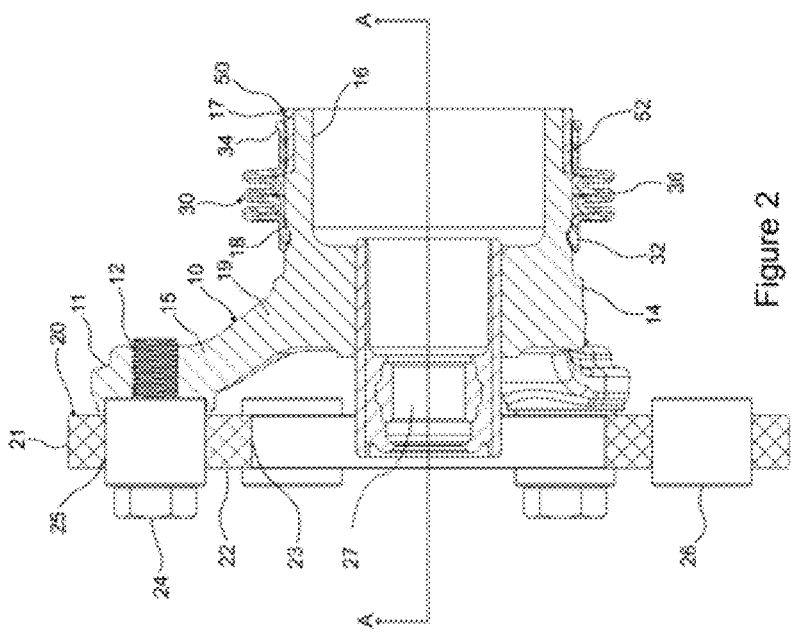

DRIVESHAFT WITH A SLIDABLE COUPLING

RELATED APPLICATIONS

This application is a U.S. National Phase of International Application No. PCT/TR2019/050490, filed Jun. 22, 2019, claiming priority to Turkish Patent Application No. 2018/13607, filed Sep. 21, 2018, contents of which are hereby incorporated by reference in their entirety.

TECHNICAL FIELD

The present invention relates to driveshafts comprising a coupling device with vibration damping means used to compensate axial loads.

PRIOR ART

In vehicles, transmission means are used to transmit rotational power from the engine or transmission assemblies to rotate one or more wheels. Driveshafts, as a commonly used drivetrain, include a central bearing and a yoke in addition to the universal joint and ensure a smooth transfer of driving force despite relative position changes between the front and rear parts of the vehicle. Due to the high torque transmitted, the driveshafts are designed to have high torsional stiffness and sufficient bending stiffness.

At the free end of the front shaft in the driveshaft, a coupling is provided which is coupled directly to the motor or the associated elements. The coupling transmits vibrations from the motor or gearbox to the driveshaft via the component to which it transmits the rotational movement. In cases where such vibrations produce impact, the driveshaft is subjected to stress from the fixing parts.

U.S. Pat. No. 7,178,423 discloses the noise and vibration damping structure for rotating elements such as a driveshaft assembly in the vehicle transmission system. A noise and vibration damping internal element comprises, an intermediate elastomeric member extending to the inner member, and an external member extending to the intermediate elastomeric member. The inner element is formed from a sheet-shaped material in any desired form. The outer element, on the other hand, is formed of tubular material of a length suitable to provide a desired damping frequency.

BRIEF DESCRIPTION

The object of the invention is to effectively attenuate the axial vibrations of external origin transmitted from the coupling to the driveshaft.

In order to reach above objective, the invention relates to a driveshaft assembly comprising an elongated front shaft, a retaining element being engaged from a connection end with the front shaft in a co-rotating manner and a coupling device secured to the front shaft by means of the retaining element. The driveshaft assembly of the present invention comprises a gear part extending on the connection end and the retaining element is having a sleeve fits to the gear part in axially slidable manner. Connection end of the front shaft carries the retaining part and the coupling device thereon in an axial direction. On the other hand, rotation of the coupling is ensured by transferring torque to the connection end. In this way, axial loads to the driveshaft via the coupling-connected drive assembly (eg transmission connection) are substantially damped by the movable carrier part at the front shaft end.

In a preferred embodiment, the gear part is in the form of a plurality of extending grooves spaced apart from each other surrounding the periphery of the connection end. The gear part may be formed by opening the channel forms consisting of single groove, double groove or more sub-channel groups to the connection end in axial direction. The tread portion can be formed as a channel or can be formed as a curved protrusion.

In a preferred embodiment, a bellow is fixed from one end to the sleeve and from the other end at least partially to the connection end such that radially covering the gear part. The bellow can be produced a rubber or synthetic material. The bellow is in a compact structure and protects the movable part on the connecting endpiece from external factors, e.g. dust.

In preferred embodiment, a clamp surrounds a rear part of the bellow secured to the connection end in a radially inwardly manner. The clamp secures the bellow from one end to the front shaft, preventing it from dislocating in the event of a sudden impact during operation.

In a preferred embodiment, the coupling device is having a flat flexible body on which a plurality of coupling elements is disposed and secured to the retaining element from an arm extending radially outwardly from the retaining element. The flat flexible body is arranged coaxially with the front shaft. The flexible body provides a rotatable bearing for the coupling and partially absorbs the vibrations from the coupling to the holding part by means of its flexible structure.

In a preferred embodiment, the flexible body is made of composite material. The composite material ensures endurance of the flexible body and at the same time capable of attenuation of the vibration.

In a preferred embodiment, at least three arms extending from a distal end of the retaining element at an angle equal to each other abut against the flat flexible body. The evenly angled arms provide effective torsional strength to the holding part during torque transmission. In different embodiments, double, triple arms or fork structures extending from the end of a single arm may be used, evenly spaced.

In a preferred embodiment, a hole is provided on the distal end and opens into a corresponding connection hole in the flexible body and the connection hole respectively and a nut-free screw that passes through the hole in such a way as to fasten the flexible body to the distal end. The nut-free bolt allows for a compact construction. The expression nut-free means that a part of the bolt at its free end in the connecting extension will not be used in a nut. Otherwise, the insertion of elements such as washers, nuts near the head of the bolt is not included.

In a preferred embodiment, the retaining element comprises a solid hub on one side, on which the arm extends from a proximal end, and on the other hand carries the sleeve. The solid hub increases the resistance of the arms against torsional loads during torque transfer. In addition, it provides a compact construction by housing the cuff on it. The hub has an axis of rotation that coincides with the front shaft.

In a preferred embodiment of the invention, the gear part is located at a vicinity of the connecting end of the front shaft. Thus, a front shaft, for example a tubular front shaft, is easily formed over its stroke to the free endpiece.

DESCRIPTION OF THE FIGURES

FIG. 1 is a front view of a two-part driveshaft comprising the coupling device according to invention.

FIG. 2 is a cross-sectional view of a representative embodiment of the coupling device according to the invention connected to the front driveshaft.

FIG. 3 is a rear perspective view of the coupling assembly shown in FIG. 2.

DETAILED DESCRIPTION

In this detailed description, the development according to the invention is described with reference to examples only to better illustrate the subject matter.

FIG. 1 shows a two-part representative embodiment of the driveshaft (1) according to the invention from the front. The driveshaft (1) comprises a rear shaft (2) with a universal joint (5) and a front shaft (3) with a rotational connection with a yoke (4). A coaxial coupling device (20) is provided on the front shaft (3). From the gearbox of a vehicle (not shown), the torque applied to the drive train and the coupling device (20) is transmitted to the rear shaft (not shown) via the universal joint (5) via the driveshaft (1).

FIG. 2 shows a cross-sectional view of the coupling device (20) mounted on a connection end (50) defined at a free end of the front shaft (3) on the driveshaft (1). The gear part (52) is provided on the a connection end (50) in a direction parallel to the axis of rotation and circumferentially. The gear part (52) is composed of channels obtained by cold forming. A sleeve (17) of suitable shape on the retaining element (10) forming the spline connection element is placed on the gear part (52). By means of the connection to the spline, the sleeve (17) can transmit torque on the gear part (52), but is axially movable. The movement of the sleeve (17) on the gear part (52) is a predetermined stroke (L). The stroke (L) is equal to the portion of the retaining element (10) that fits at the connection end (50), that is equal to the length of the sleeve (17). A flexible bellow (30) of synthetic material is fixed from its front part (32) by engaging a radial channel opening on the outer wall (18) of the retaining element (10). The bellow (30) pass from the rear part (34) opposite the front part (32) to an outer periphery (54) of the connection end (50). A clamp (40) is mounted on the rear part (34) of the bellow (30) in an inwardly radial prestressing manner. Between the front part (32) and the rear part (34) of the bellow (30), a stretching part (36) is provided, which shortens the length by bending the shape S in a short position and extends in a long position by stretching up to the stroke (L).

In FIG. 3, the coupling device (20), fixed by the retaining element (10), is shown in perspective from behind. The retaining element (10), which is in the form of three arms (15) extending radially outward evenly from a hub (14), carries the sleeve (17) coaxially extending through the hub (14) to the front shaft (3) on its opposite side. The sleeve (17) and arms (15) are coaxially integrated with the hub (14). A coupling device (20) is secured to a distal end (11) of the outwardly inclined arms (15) from a front face. At the distal ends (11), a through hole (12) is provided. In contrast, on the flat flexible body (22) of the coupling device (20), a connection hole (25) is provided, each opening corresponding to a hole (12) in three arms (15). A coupling element (26) is fixed in each connection hole (25). On the other hand, a further connection hole (25) is formed and a coupling element (26) is mounted in each other to provide three connection parts on the flexible body (22) crosswise to the connection holes (25) to which the arms (15) are connected. An outer periphery (21) of the flexible body (22) has a radially grooved form, with a curved projection and a curved recess therebetween, in the regions where the coupling elements (26) are located. On the other hand, the middle center of the flexible body (22) has a cut-out structure (23) to provide access to the connection end (50) from the outer face of the coupling device (20). A screw (24) reaches the hole (12) by passing through the coupling element (26) with the cap part facing outwards. The threads hold the hole (12) and secure the coupling element (26) to the retaining element (10). The length of the screwed portion of the screw (24) is short so that it does not form an extension to provide a nut connection through the hole (12). Thus, the screw (24) connects the coupling element (26) to which it rests from the cap portion by pulling towards the distal end (11).

When the front shaft (3) is seated from the connection end (50) on the sleeve (17), the connection to the spline is formed, so that the sleeve (17), which can move on the gear part (52) in the axial direction up to the maximum stroke (L), can transmit the high torque provided by the coupling device (20) to the front shaft (3). After the driveshaft (1) is mounted on the vehicle, the movement transmission member mounted on the coupling elements (26) on the flexible body (22) from the transmission rotates the coupling device (20). In this way, the torque from the transmission rotates the retaining piece (10) and the connection end (50) through which the sleeve (17) is rotatably connected by means of the arms (15). In the meantime, the vibrations coming axially to the coupling device (20) in the direction of the axis of rotation are both partially damped by the flexible body (22) to which the coupling (20) and the arms (15) are directly connected, and are compensated by forward or reverse axial movement of the arms (15) on the axis of rotation by vibration or impact, before the sleeve (17) advances on the gear part (52) without being transmitted to the front shaft (3). However, thanks to the gear part (52), the sleeve (17) transmits torque from the connection end (50) to the front shaft (3) without being affected by axial vibration or impact. With the help of the yoke (4), the rotational movement of the front shaft (3) is transferred to the rear shaft (2) and the torque from one end of the driveshaft (1) is transferred to the other end by the rotation of the universal joint (5).

In a preferred embodiment, the coupling device (20) has the flat flexible body (22) on which a plurality of coupling elements (26) is disposed and secured to the retaining element (10) from the arm (15) extending radially outwardly from the retaining element (10). The flat flexible body (22) is arranged coaxially with the front shaft (3). The flexible body (22) provides a rotatable bearing (27) for the coupling element (26) and partially absorbs the vibrations from the coupling element (26) to the holding part by means of its flexible structure.

REFERANCE NUMBERS

1 Driveshaft
2 Rear shaft
3 Front shaft
4 Yoke
5 Universal joint
10 Retaining element
11 Distal end
12 Hole
14 Hub
15 Arm
16 Inner opening
17 Sleeve
18 Outer wall
19 Proximal end
L Stroke
20 Coupling device -continued

| REFERANCE NUMBERS |
| --- |
| 21 Outer periphery |
| 22 Flexible body |
| 23 Cutout |
| 24 Screw |
| 25 Connection hole |
| 26 Coupling |
| 30 Bellow |
| 32 Front part |
| 34 Rear part |
| 36 Stretching part |
| 40 Clamp |
| 50 Connection end |
| 52 Gear part |
| 54 Outer periphery |

The invention claimed is:

1. A driveshaft assembly comprising:
a rear shaft with a universal joint;
an elongated front shaft, a first end of the front shaft rotationally connected to a yoke;
a retaining element being engaged from a connection end of the front shaft in a co-rotating manner, wherein the connection end is a second end of the front shaft, and a gear part is located at a vicinity of the connection end of the front shaft; and
a coupling device secured to the second end of the front shaft by means of the retaining element characterized by the gear part extending onto the connection end and the retaining element having a sleeve fit to the gear part in an axially slidable manner,
wherein the coupling device has a flat flexible body on which a plurality of coupling elements is disposed, each of a set of coupling elements among the plurality of coupling elements is secured to the retaining element at an arm extending radially outwardly from a center of the retaining element, the flat flexible body provides a rotatable bearing and partially absorbs vibrations from the set of coupling elements to the retaining element by means of its flexible structure,
wherein the vibrations coming axially to the coupling device in a direction of an axis of rotation are both partially damped by the flat flexible body of the coupling device to which each arm is directly connected, and are compensated by forward or reverse axial movement of the arm on the axis of rotation by vibration or impact, before the sleeve advances on the gear part without being transmitted to the front shaft, the sleeve transmits torque from the connection end to the front shaft via the gear part without being affected by axial vibration or impact; and rotational movement of the front shaft is transferred to the rear shaft and the torque from one end of the driveshaft assembly is transferred to the other end by rotation of the universal joint via the yoke.

2. The driveshaft assembly according to claim 1, wherein the gear part is in the form of a plurality of extending grooves spaced apart from each other surrounding the periphery of the connection end.

3. The driveshaft assembly according to claim 2, wherein a bellow is fixed from one end of the bellow to the sleeve and from the other end of the bellow at least partially to the connection end such that the bellow radially covers the gear part.

4. The driveshaft assembly according to claim 3, wherein a clamp surrounds a rear part of the bellow secured to the connection end in a radially inwardly manner.

5. The driveshaft assembly according to claim 1, wherein at least three arms extending from a distal end of the retaining element at an angle equal to each other abut against the flat flexible body.

6. The driveshaft assembly according to claim 5, wherein a hole is provided on the distal end and opens into a corresponding connection hole in the flat flexible body and a nut-free screw passes through the hole and the connection hole respectively in such a way as to fasten the flat flexible body to the distal end.

7. The driveshaft assembly according to claim 1, wherein the retaining element comprises a solid hub on one side extending from a proximal end of the arm and on the other hand carrying the sleeve.

* * * * *

UNITED STATES PATENT AND TRADEMARK OFFICE
CERTIFICATE OF CORRECTION

PATENT NO. : 12,276,308 B2
APPLICATION NO. : 17/277709
DATED : April 15, 2025
INVENTOR(S) : Korkut Tasan Page 1 of 1

It is certified that error appears in the above-identified patent and that said Letters Patent is hereby corrected as shown below:

On the Title Page

Please add Item (30) after Item (65):
-- Foreign Application Priority Data
Sep. 21, 2018 (TR) ......................... 2018/13607 --

Signed and Sealed this
Fifth Day of August, 2025

Coke Morgan Stewart
*Acting Director of the United States Patent and Trademark Office*